UNITED STATES PATENT OFFICE 2,353,705

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 15, 1942, Serial No. 447,162

8 Claims. (Cl. 252—341)

This invention relates primarily to the resolution of petroleum emulsions.

The main object of our invention is to provide a novel process for resolving petroleum emulsions of the water-in-oil type, that are commonly referred to as "cut oil," "roily oil," "emulsified oil," etc., and which comprise fine droplets or naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

We have discovered that if one oxyalkylates glycerol so as to introduce at least three oxyalkylene radicals for each hydroxyl group, and if the product so obtained is reacted with a polybasic carboxy acid having not over eight carbon atoms, and in such a manner as to yield a fractional ester, due to the presence of at least one free carboxyl radical, one can then esterify said acidic material or intermediate product with at least one mole of an alcoholic compound of the type herein described to give a variety of new compositions of matter which are efficient demulsifiers for crude oil emulsions.

The compounds herein described that are used as the demulsifier of our process may be produced in any suitable manner, but are usually manufactured by following one of two general procedures. In one of said procedures the oxyalkylated glycerol, which is, in essence, a polyhydric alcohol, is reacted with a polybasic acid so as to give an acidic material or intermediate product, which, in turn, is reacted with an alcoholic body of the kind hereinafter described, and momentarily indicated by the formula $R_1(OH)_m$. Generically, the alcoholic body herein contemplated may be considered a member of the class in which $m$ may vary from 1 to 10, although the specific significance of $m$ in the present instance will be hereinafter indicated. The second procedure is to react an alcohol of the formula type $R_1(OH)_m$ with a polybasic acid so as to produce an intermediate product, and then react said intermediate product or fractional ester with the selected oxyalkylated glycerol.

Glycerol may be conveniently indicated by the following formula:

If treated with on oxyalkylating agent, and momentarily, consideration will be limited to an oxyethylating agent, one may obtain an oxyethylated glycerol of the following formula type:

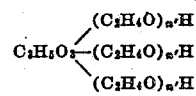

in which the value of $n'$ may vary from 3 to 10 and all the values of $n'$ need not be identical. If a polybasic carboxy acid be indicated by the formula:

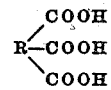

then the acylic reaction product of one mole of oxyethylated glycerol and one mole of a polybasic carboxy acid may be indicated by the following formula:

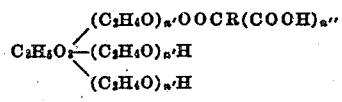

in which $n''$ has the value of one or two. Similarly, if two moles of the polybasic acid be used, then the compound may be indicated by the following formula:

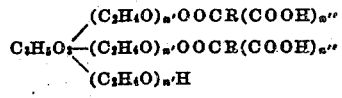

Likewise, if three moles of a polybasic acid are employed, the compound may be indicated by the following formula:

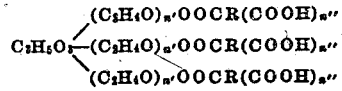

If a fractional ester of the kind exemplified by the three preceding formulas is reacted with one or more moles of an alcohol of the kind previously described in a generic sense as $R_1(OH)_m$, then obviously, one may obtain a material of the type indicated by the following formula:

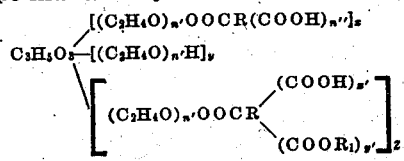

in which $x$ is 0, 1 or 2, $y$ is 0, 1 or 2, and $z$ is 1, 2 or 3, and $x'$ is 0 or 1, and $y'$ is 1 or 2.

It has been previously stated that compounds of the type herein contemplated may be obtained by oxyalkylating agents, without being limited to ethylene oxide. Suitable oxyalkylating agents include ethylene oxide, propylene oxide, butylene oxide and glycid, which, although not included, strictly speaking, by the unitary structure $C_nH_{2n}O$, is included within the meaning of the hereto appended claims and may be simply considered as a variant of propylene oxide, i. e., hydroxypropylene oxide. Similarly, where a carboxylic hydrogen atom appears, it may be replaced by metal, an ammonium radical, or substituted ammonium radical, or by an organic group derived from an alcohol, such as an aliphatic alcohol, an aralkyl alcohol, or an alicyclic alcohol. It may also be converted into an amide, including a polyamino amide. Thus, the preceding formula may be rewritten in its broader scope, as follows:

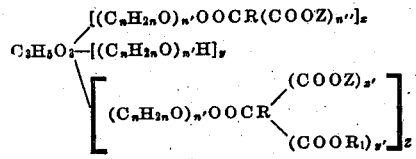

in which $n$ replaces the numbers 2, 3 or 4, Z includes the acidic hydrogen atom itself. In the above formula, and hereafter for convenience, $R_1$ is intended to include any hydroxyl groups that remain.

If the compounds herein contemplated are obtained under usual conditions, at the lowest temperatures, then the monomeric form is most likely to result.

The production of the compounds herein contemplated is the result of one or more esterification steps. As is well known, esterification procedures can be carried out in various manners, but generally speaking, esterifications can be carried out at the lowest feasible temperatures by using one or several procedures. One procedure is to pass an inert dried gas through the mass to be esterified, and have present at the same time a small amount of a catalyst, such as dried HCl gas, a dried sulfonic acid, or the like. Another and better procedure, in many instances, is to employ the vapors of a suitable liquid, so as to remove any water formed and condense both the vapors of the liquid employed and the water in such a manner as to trap out the water and return the liquid to the reacting vessel. This procedure is commonly employed in the arts, and for convenience, reference is made to U. S. Patent No. 2,264,759, dated December 2, 1941, to Paul C. Jones.

Referring again to the last two formulas indicating the compounds under consideration, it can be readily understood that such compounds, in numerous instances, have the property of polyfunctionality. In view of this fact, where there is at least one residual carboxyl and at least one residual hydroxyl, one would expect that under suitable conditions, instead of obtaining the monomeric compounds indicated, one would in reality obtain a polymer in the sense, for example, that polyethylene glycols represent a polymer of ethylene glycol. The term "polymer" is frequently used to indicate the polymerized product derived from a monomer in which the polymer has the same identical composition as the monomer. In the present instance, however, polymerization involves the splitting and loss of water so that the process is essentially self-esterification. Thus, strictly speaking, the polymeric compounds are not absolutely polymers of the monomeric compounds, but since, for all practical purposes, they can be so indicated, and since such practice is common in the arts concerned with materials of this type, it is so adopted here. Thus, reference in the appended claims to polymers is intended to include the self-esterification products of the monomeric compounds.

In view of what has been said, and in view of the recognized hydrophile properties of the recurring oxyalkylene linkages, particularly the oxyethylene linkage, it is apparent that the materials herein contemplated may vary from compounds which are clearly water-soluble through self-emulsifying oils, to materials which are balsam-like and sub-resinous or semi-resinous in nature. The compounds may vary from monomers to polymers, in which the unitary structure appears a number of times, for instance, 10 or 12 times. It is to be noted that true resins, i. e., truly insoluble materials of a hard plastic nature, are not herein included. In other words, the polymerized compounds are soluble to a fairly definite extent, for instance, at least 5% in some solvents, such as water, alcohol, benzene, dichloroethyl ether, acetone, cresylic acid, acetic acid, ethyl acetate, dioxane or the like. This is simply another way of stating that the polymerized product contemplated must be of the sub-resinous type, which is commonly referred to as an A resin, or a B resin, as distinguished from a C resin, which is a highly infusible, insoluble resin (see Ellis, Chemistry of Synthetic Resins (1935), pages 862, et seq.).

Reviewing the form as presented, it is obvious that one may obtain compounds within the scope disclosed, which contain neither a free hydroxyl nor a free carboxyl group, and one may also obtain a compound of the type in which there is present at least one free carboxyl, or at least one free hydroxyl, or both. The word "polar" has sometimes been used in the arts in this particular sense to indicate the presence of at least one free hydroxyl group, or at least one free carboxyl group, or both. In the case of the free carboxyl group, the carboxylic hydrogen atom may, of course, be replaced by any ionizable hydrogen atom equivalent, such, for example, as a metal, an ammonium radical, a substituted ammonium radical, etc. In the hereto appended claims the word "polar" is used in this specific sense.

We are aware that compounds similar to those contemplated in the presence instance may be derived from polyhydroxylated compounds having more than three hydroxyl groups. For instance, they may be derived from acyclic diglycerol, triglycerol, tetraglycerol, mixed polyglycerols, mannitol, sorbitol, various hexitols, dulcitol, pentaerythritol, sorbitan, mannitan, dipentaerythritol mono-ether, and other similar compounds. Such particular types in which higher hydroxylated materials are subjected to oxyalkylation and then employed in the same manner as oxyalkylated glycerol, is employed in the present instance, are not contemplated in this specific case, although attention is directed to the same.

Reference is also made to other oxyalkylated compounds which may be used as reactants to replace oxyalkylated glycerol, or oxyalkylated ethylene glycol, which latter reactant is described in a co-pending application hereinafter referred to. The reactants thus contemplated include the type in which there is an amino or amido nitrogen atom, particularly, when present in a low molal type of compound prior to oxyalkylation, reference being made to polyhydroxylated materials, including those having two or three hydroxyl groups, as well as those having more than three hydroxyl groups. For instance, the oxyalkylated derivatives, particularly the oxyethylated derivatives of ethyldiethanolamine, bis(hydroxyethyl)-acetamide, the acetamide of tris(hydroxymethyl)aminomethane, tetrahydroxylated ethylene diamine, etc. Compounds may also be derived from cyclic diglycerol and the like.

Furthermore, for convenience, attention is directed to a somewhat similar class of materials which are described in our co-pending application Serial No. 401,378, filed July 7, 1941, now Patent No. 2,324,490, dated July 20, 1943. Said co-pending application involves the use of the same type of alcoholic bodies for reactants, but is limited, among other things, to the compounds which are essentially symmetrical in nature, for instance, involving the introduction of two alcoholic residues, whereas, in the present instance, one, two, or three, or more, might be introduced.

As indicated previously, the polybasic acids employed are limited to the type having not more than eight carbon atoms, for example, oxalic, malonic, succinic, glutaric, adipic, maleic, and phthalic. Similarly, one may employ acids such as fumaric, glutaconic, and various others, such as citric, malic, tartaric, and the like. The selection of the particular tribasic or dibasic acid employed, is usually concerned largely with the convenience of manufacture of the finished ester, and also the price of the reactants. Generally speaking, phthalic acid or anhydride tends to produce resinous materials, and greater care must be employed if the ultimate or final product be of a subresinous type. Specifically, the preferred type of polybasic acid is such as to contain six carbon atoms or less. Generally speaking, the higher the temperature employed, the easier it is to obtain large yields of esterified product, although polymerization may be stimulated. Oxalic acid may be comparatively cheap, but it decomposes readily at slightly above the boiling point of water. For this reason it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable, and also, everything else considered, the cost is comparatively low on a per molar basis, even though somewhat higher on a per pound basis. Succinic acid or the anhydride has many attractive qualities of maleic anhydride, and this is also true of adipic acid. For purposes of brevity, the bulk of the examples, hereinafter illustrated, will refer to the use of maleic anhydride, although it is understood that any other suitable polybasic acid may be employed. Furthermore, reference is made to derivatives obtained by oxyethylation, although, as previously pointed out, other oxyalkylating agents may be employed.

As far as the range of oxyethylated glycerols employed as reactants is concerned, it is our preference to employ those in which approximately 15 to 24 oxyethylene groups have been introduced into a single glycerol molecule. This means that approximately five to eight oxyethylene radicals have been introduced for each original hydroxyl group.

The oxyalkylation of glycerol is a well known procedure (see Example 11 of German Patent No. 605,973, dated November 22, 1934, to I. G. Farbenindustrie Akt. Ges.). The procedure indicated in the following three examples is substantially identical with that outlined in said aforementioned German patent.

OXYETHYLATED GLYCEROL

Example 1

184 pounds of glycerol is mixed with ½%, by weight, of caustic soda solution having a specific gravity of 1.383. The caustic soda acts as a catalyst. The ethylene oxide is added in relatively small amounts, for instance, about 44 pounds at a time. The temperature employed is from 150–180° C. Generally speaking, the gauge pressure during the operation approximates 200 pounds at the maximum, and when reaction is complete, drops to zero, due to complete absorption of the ethylene oxide. When all the ethylene oxide has been absorbed and the reactants cooled, a second small portion, for instance, 44 more pounds of ethylene oxide, are added and the procedure repeated until the desired ratio of 15 pound moles of ethylene oxide to one pound mole of glycerol is obtained. This represents 660 pounds of ethylene oxide for 92 pounds of glycerol.

OXYETHYLATED GLYCEROL

Example 2

The ratio of ethylene oxide is increased to 18 pound moles for each pound mole of glycerol. Otherwise, the same procedure is followed as in Example 1, preceding.

OXYETHYLATED GLYCEROL

Example 3

The same procedure is followed as in the two previous examples, except that the ratio of ethylene oxide to glycerol is increased to 21 to one.

OXYETHYLATED GLYCEROL MALEATE

Example 1

One pound mole of oxyethylated glycerol (1 to 15 ratio) prepared in the manner previously described is treated with one pound mole of maleic anhydride and heated at approximately 110° C. for approximately thirty minutes to two hours, with constant stirring, so as to yield a monomaleate.

OXYETHYLATED GLYCEROL MALEATE

Example 2

The same procedure is followed as in the preceding example, except that two moles of maleic anhydride are employed so as to obtain the dimaleate instead of the monomaleate.

Oxyethylated Glycerol Maleate

Example 3

The same procedure is followed as in the two preceding examples, except that three moles of maleic anhydride are employed so as to obtain the trimaleate.

Oxyethylated Glycerol Maleate

Example 4

The same procedure is employed as in the preceding examples, except that oxyethylated glycerol (ratio 1 to 18) is substituted in place of oxyethylated glycerol (ratio 1 to 15).

Oxyethylated Glycerol Maleate

Example 5

The same procedure is employed as in the preceding examples, except that oxyethylated glycerol (ratio 1 to 21) is employed instead of oxyethylated glycerol (ratio 1 to 15) or (1 to 18).

Previous reference has been made to an alcoholic body which has been defined generically by the formula $R_1(OH)_m$. The sub-generic class of alcoholic compounds employed as reactants in the manufacture of the present compounds, are basic hydroxylated acylated polyamino compounds free from ether linkages. Such materials are described inter alia in U. S. Patent No. 2,243,329, dated May 27, 1941, to De Groote and Blair. For instance, this particular patent describes a basic type acylated polyamine of the following formula:

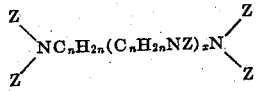

in which $n$ represents a small whole number varying from 2 to 10; $x$ is a small whole number varying from 1 to 10; Z is a member of the class consisting of H, RCO, R'CO, and D, in which RCO represents an acyl radical derived from a higher molecular weight carboxy acid; R'CO is an acyl radical derived from a lower molecular weight carboxy acid having 6 carbon atoms or less; and D is a member of the class consisting of alkyl, hydroxyalkyl, aminoalkyl, and acyloxyalkylene, in which instance the acyl group is a member of the class consisting of RCO and R'CO; and the acylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical.

Needless to say, compounds of the kind therein described may be derived from polyamines having only two amino nitrogen atoms, as differentiated from polyamines having 3 amino nitrogen atoms or more. Thus, in the above formula, $x$ may represent zero, as well as the numerals 1 to 10. It is obvious that numerous examples of the compounds indicated by the above formula are hydroxylated, due to the presence of one or more hydroxylated radicals of the following types:

(a) There may be present a hydroxyethyl group or a hydroxypropyl group or the like;

(b) The acyl group of the higher molecular weight carboxy acid may contain a hydroxyl group, as, for example, ricinoleic acid, hydroxystearic acid, etc.;

(c) The low molecular weight carboxy acid present may have a hydroxyl group in the acyl radical, such as would be the case when the radical is derived from lactic acid; and (d) The amines above described may be considered as derivatives of dichloralkanes or alkylene dichlorides. This is discussed clearly in the aforementioned De Groote and Blair patent. If such amines, which are derivatives of propylene dichloride, as indicated by the following composition:

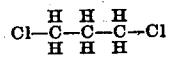

are, in turn, derived from glycerol dichlorhydrin (betahydroxy propylene dichloride) of the following composition:

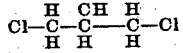

it is obvious that another means is available for introducing an alcoholiform hydroxyl radical. Since this particular application or modification is extremely narrow in scope, and applies only to the instances where the alkylene group is a propylene radical, it is understood that in the hereto appended claims it is intended that wherever a propylene group is included, the hydroxypropylene group is considered as the functional equivalent, for the reasons stated.

Although in the compounds above described the radical RCO may be derived from a higher molecular weight carboxy acid, in the present instance the invention is concerned with the particular type, in which RCO is derived from a more narrow class, to wit, detergent-forming monocarboxy acids.

It is well known that certain monocarboxy organic acids containing eight carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids, for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

The chemical compound or composition of matter employed as the demulsifier of our process is preferably derived from unsaturated fatty acids having 18 carbon atoms. Such unsaturated fatty acids include the fatty acids, such as oleic acid, ricinoleic acid, linoleic acid, linolenic acid, etc. One may employ mixed fatty acids, as, for example, the fatty acids obtained from hydrolysis of cottonseed oil, soyabean oil, etc. Our preferred demulsifier is obtained from unsaturated fatty acids, and more especially, unsaturated fatty acids containing a hydroxyl radical, or unsaturated fatty acids, which have been subjected to an oxidation or oxyalkylation step, such as oxyethylation. Of the various unsaturated fatty acids, our choice is the hydroxylated type, to wit, ricinoleic acid.

For purposes of brevity, the bulk of any subsequent description will be concerned with fatty acids, and particularly unsaturated fatty acids. Further reference to other detergent-type monocarboxy acids is quite limited; but attention is directed to the fact that an adequate description is found in the aforementioned De Groote and Blair patent. The following examples are substantially as they appear in said patent. One must not forget, however, that in addition to the amines described in said patent as reactants, one can also use reagents such as ethylene diamine, bis(hydroxyethyl)ethylene diamine, tris(hydroxyethyl)ethylene diamine, etc. In view of what is said in the aforementioned De Groote and Blair patent, it will be obvious why the description of the amide is given as a primary raw material.

*Amide Example 1*

283 parts of stearic acid amide are heated with 438 parts of triethylene tetramine for 10 hours to about 130° C. until a test portion is soluble in diluted hydrochloric acid; at the end of the reaction the pressure is preferably lowered to about 15 mm. Hg. Thereby 380 parts of a product probably corresponding to the formula

$$C_{17}H_{35}CO.NH(C_2H_4NH)_2C_2H_4NH_2$$

(monostearyl triethylene tetramine) are obtained.

*Amide Example 2*

281 parts of oleic acid amide yield with 584 parts of triethylene tetramine, when heated for 10 hours to about 130° C., 400 parts of a product which is soluble in diluted hydrochloric acid, and probably corresponds to the mono-oleyl triethylene tetramine.

*Amide Example 3*

283 parts of stearic acid amide are heated in the same way as described in Examples 1 and 2 with 400 parts of a mixture of polyalkylene polyamines obtainable by heating ethylene dichloride with ammonia under pressure and removing any ethylene diamine formed during the latter reaction. After distilling the excess of bases under reduced pressure, 430 parts of a paste are obtained which is soluble in diluted acids.

*Amide Example 4*

300 parts of ricinoleic acid amide yield with 400 parts of a mixture of bases according to Example 3, when heated to about 8 hours to 150–160° C., 450 parts of a mixture of acylated bases which is easily soluble in diluted acetic or hydrochloric acid.

*Amide Example 5*

From 300 parts of ricinoleic acid amide and 400 parts of a mixture of polyalkylene polyamines according to Examples 3 and 4, by heating for several hours to 150° C., simultaneously passing a current of dry air free from $CO_2$, and finally removing the excess of bases partly by distilling under reduced pressure and partly by washing with water, there are obtained 430 parts of a mixture of polyalkylene polyamines which is acylated by the radical of ricinoleic acid.

*Amide Example 6*

100 parts by weight of olive oil and 100 parts by weight of diethylenetriamine are heated to about 180–200° C. until a test portion of the reaction mixture is soluble in dilute hydrochloric acid. After distilling off the excess of diethylenetriamine, advantageously under reduced pressure, there remains a strongly viscous mass, the hydrochloric acid solution of which has great foam-forming properties.

A similar product is obtainable by heating free oleic acid with a large excess of diethylenetriamine under the same conditions.

*Amide Example 7*

310 parts by weight of the ethylester of oleic acid are heated with 286 parts by weight of triethylene tetramine at about 160° C. for 12 hours when a homogeneous solution is formed; the alcohol formed and the excess of triethylene-tetramine are distilled off. The residual reaction product forms a brown oil, which is difficultly soluble in water and readily soluble in alcohol, benzene and dilute hydrochloric acid.

A quite similar product is obtainable by heating free oleic acid with an excess of triethylene tetramine to about 180–200° C. and distilling off the excess of triethylene-tetramine under reduced pressure.

*Amide Example 8*

200 parts by weight of olive oil are heated at 180–200° C. with 300 parts by weight of a mixture of bases, which is obtained by the action of ammonia on ethylene chloride at 80–120° C. under pressure of 10 atm. and after distilling off the ethylene diamine, said mixture of bases boiling at about 15 mm. mercury between 90 and 300° C. When a test portion of the reaction product is smoothly soluble in dilute hydrochloric acid, the water formed and the excess bases are distilled off under reduced pressure and a yellowish brown oil is obtained, a solution of which in dilute hydrochloric acid can be used as a washing or wetting agent.

*Amide Example 9*

350 grams of monostearin and 300 grams of triethylenetetramine are heated together at 180–200° C. for 3 to 4 hours and then the displaced glycerine and the excess triethylenetetramine were washed out with water and the resulting product dried.

*Amide Example 10*

In the prior examples tetraethylene pentamine is substituted for the amines employed in the prior examples by using a suitable molecular equivalent, but without increasing the amount of fatty acid compound employed.

*Amide Example 11*

Purified naphthenic acids derived from Gulf Coast crudes are employed in various examples preceding.

*Amide Example 12*

Carboxy acids derived from oxides of Pennsylvania crude oil and having approximately 10–14 carbon atoms per mole of fatty acid, are substituted in the previous examples.

BASIC TYPE OXYALKYLATION COMPOUND OF AMIDO DERIVATIVE OF POLYAMINE

*Intermediate Example 1*

Materials of the kind described in Amide Examples 1–12, preceding, are treated with one mole of ethylene oxide in the manner previously described, so as to introduce one oxyethyl radical.

BASIC TYPE OXYALKYLATION COMPOUND OF AMIDO DERIVATIVE OF POLYAMINE
Intermediate Example 2

The same procedure is followed as in the preceding example, except that more than one oxyalkyl group, or rather, oxyethyl group, is introduced, the preference being to introduce two or three hydroxyethyl groups.

BASIC TYPE OXYALKYLATION COMPOUND OF AMIDO DERIVATIVE OF POLYAMINE
Intermediate Example 3

Propylene oxide is substituted for ethylene oxide in Examples 1 and 2, preceding.

BASIC TYPE OXYALKYLATION COMPOUND OF AMIDO DERIVATIVE OF POLYAMINE
Intermediate Example 4

Glycid is substituted for ethylene oxide in Examples 1 and 2, preceding.

OXYALKYLATION DERIVATIVES OF POLYAMINE
Example 1

Suitable quantities of diethylene triamine are treated with ethylene oxide in various amounts, so as to introduce 1, 2 and 3 hydroxyethyl groups. The temperature employed is approximately 180–240°, and the catalyst is preferably sodium methylate in amounts varying from ½% to 1½%.

OXYALKYLATION DERIVATIVES OF POLYAMINE
Example 2

Triethylene tetramine is substituted for diethylene triamine in Example 1.

OXYALKYLATION DERIVATIVES OF POLYAMINE
Example 3

Tetraethylene pentamine is substituted for diethylene triamine in Example 1.

OXYALKYLATION DERIVATIVES OF POLYAMINE
Example 4

Pentaethylene hexamine is substituted for diethylene triamine in Example 1.

BASIC TYPE ACYLATION DERIVATIVE OF OXYALKYLATED POLYAMINE
Intermediate Example 5

A material of the kind described in oxyalkylation derivatives of polyamines, Example 1, is acylated in the same manner in which amides are obtained in Amide Examples 1–12, previously described.

BASIC TYPE ACYLATION DERIVATIVE OF OXYALKYLATED POLYAMINE
Intermediate Example 6

A material of the kind described in Oxyalkylation derivatives of polyamine, Example 2, is acylated in the same manner in which amides are obtained in Amide Examples 1–12, previously described.

BASIC TYPE ACYLATION DERIVATIVE OF OXYALKYLATED POLYAMINE
Intermediate Example 7

A material of the kind described in Oxyalkylation derivatives of polyamine, Example 3, is acylated in the same manner in which amides are obtained in Amide Examples 1–12, previously described.

BASIC TYPE ACYLATION DERIVATIVE OF OXYALKYLATED POLYAMINE
Intermediate Example 8

A material of the kind described in Oxyalkylation derivatives of polyamine, Example 4, is acylated in the same manner in which amides are obtained in Amide Examples 1–12, previously described.

BASIC TYPE RE-ACYLATED OXYALKYLATION COMPOUND OF AMIDO DERIVATIVE OF POLYAMINE
Intermediate Example 9

Materials of the kind exemplified by Intermediates 1–4, preceding, which have been designated for convenience as "Basic type oxyalkylation compound of amido derivative of polyamine," i. e., prepared by converting the polyamine into an amide and then subjecting the same to oxyalkylation, may, of course, be re-acylated, or acylated further, so as to introduce acyl groups of the kind described. Under such circumstances one invariably obtains the mixed type, i. e., the esteramide type, provided that there has been total oxyalkylation. Excellent intermediates are obtained by such process, i. e., the re-acylation, or second acylation, of materials of the kind exemplified by intermediates 1–4, inclusive, and particularly when such re-acylation takes place by means of detergent-forming acids, which, in the preferred form, are illustrated by fatty acids, and more particularly, by the hydroxylated fatty acid type. The preferred number of this type, in the present instance, as in other instances, is ricinoleic acid.

COMPLETED MONOMERIC DERIVATIVE
Example 1

One pound mole of a product of the kind described under the heading "Oxyethylated glycerol maleate, Example 1" is reacted with one pound mole of "Basic type oxyalkylation compound of amido derivative of polyamine, Intermediate Example 1" and "Basic type oxyalkylation compound of amido derivative of polyamine, Intermediate Example 2," preferably in the absence of any high boiling hydrocarbon or inert solvent. However, if an inert vaporizing solvent is employed, it is generally necessary to use one which has a higher boiling range than xylene, and sometimes removal of such solvent might present a difficulty. In other instances, however, such high boiling inert vaporizing solvent, if employed, might be permitted to remain in the reacted mass and appear as a constituent or ingredient of the final product. In any event, our preference is to conduct the reaction in the absence of any such solvent and permit the reaction to proceed with the elimination of water. The temperature of reaction is about 180 to 200° C. and time of reaction about 20 hours.

COMPLETED MONOMERIC DERIVATIVE
Example 2

The same procedure is followed as in Completed monomeric derivative, Example 1, preceding, except that the dimaleate described under the heading "Oxyethylated glycerol maleate, Example 2" is used instead of the monomaleate.

COMPLETED MONOMERIC DERIVATIVE
Example 3

The same procedure is followed as in the two preceding examples, except that the trimaleate is substituted for the monomaleate or dimaleate in the two preceding examples.

COMPLETED MONOMERIC DERIVATIVE
Example 4

The same procedure is followed as in Examples 2 and 3, immediately preceding, except that for each pound mole of the dimaleate, or each pound mole of the trimaleate, instead of using one pound mole of an alcoholic compound of the kind described in Completed monomeric derivative, Example 1, preceding, one employs two pound moles.

COMPLETED MONOMERIC DERIVATIVE
Example 5

The same procedure is followed as in Example 3, preceding, except that for each pound mole of trimaleate, instead of adding one pound mole of an alcoholic compound of the kind described one adds three pound moles of an alcoholic compound of the kind described, in Completed monomeric derivative, Example 1, preceding, for reaction.

COMPLETED MONOMERIC DERIVATIVE
Example 6

Reference to the preceding examples will show that in each and every instance oxyethylated glycerol (ratio 1 to 15) has been employed as a raw material or primary reactant. In the present instance, a more highly oxyethylated glycerol is employed, to wit, one involving the ratio of 1 to 18. (See Oxyethylated glycerol maleate, Example 4, preceding.)

COMPLETED MONOMERIC DERIVATIVE
Example 7

The same procedure is followed as in Example 6, immediately preceding, except that the oxyethylated glycerol employed represents one having an even higher degree of oxyethylation. For example, one indicated by the ratio of 1 to 21. (See Oxyethylated glycerol maleate, Example 5, preceding.)

COMPLETED MONOMERIC DERIVATIVE
Example 8

The same procedure is employed as in Examples 1 to 7, preceding, except that the alcoholic compound employed for reaction with the ethylated glycerol maleate is of the kind described under "Basic type acylation derivative of oxyalkylated polyamine, Intermediate Examples 5 to 8, inclusive.

COMPLETED MONOMERIC DERIVATIVE
Example 9

The same procedure is followed as in Examples 1 to 7, preceding, except that the alcoholic body is one of the kind described previously under the heading "Basic type re-acylated oxyalkylation compound of amido derivative of polyamine, Intermediate Example 9.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. (See U. S. Patent No. 2,075,107, dated March 30, 1937, to Frasier.)

Sometimes esterification is conducted most readily in the presence of an inert solvent, that carries away the water of esterification which may be formed, although as is readily appreciated, such water of esterification is absent when such type of reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well-known procedure and requires no further elaboration.

In the previous monomeric examples there is a definite tendency, in spite of precautions, at least in a number of instances, to obtain polymeric materials and certain cogeneric by-products. This is typical, of course, of organic reactions of this kind, and as is well known, organic reactions per se are characterized by the fact that 100% yields are the exception, rather than the rule, and that significant yields are satisfactory, especially in those instances where the by-products or cogeners may satisfactorily serve with the same purpose as the principal or intentional product. This is true in the present instance. In many cases when the compound is manufactured for purposes of demulsification, one is better off to obtain a polymer in the sense previously described, particularly a polymer whose molecular weight is a rather small multiple of the molecular weight of the monomer, for instance, a polymer whose molecular weight is two, three, four, five, or six times the molecular weight of the monomer. Polymerization is hastened by the presence of an alkali, and thus, in instances where it is necessary to have a maximum yield of the monomer, it may be necessary to take such precautions that the alkali used in promoting oxyethylation of glycerol, be removed before subsequent reaction. This, of course, can be done in any simple manner by conversion to sodium chloride, sodium sulfate, or any suitable procedure.

In the preceding examples of the Completed monomeric derivative, Examples 1 to 10, inclusive, no reference is made to the elimination of such alkaline catalyst, in view of the effectiveness of the low multiple polymers as demulsifiers. Previous reference has been made to the fact that the carboxylic hydrogen atom might be variously replaced by substituents, including organic radicals, for instance, the radicals obtained from alcohols, hydroxylated amines, nonhydroxylated amines, polyhydric alcohols, etc. Obviously, the reverse is also true, in that a free hydroxyl group may be esterified with a selected acid, varying from such materials as ricinoleic acid to oleic acid, including alcohol acids, such as hydroxyacetic acid, lactic acid, ricinoleic acid and also polybasic acids of the kind herein contemplated.

With the above facts in mind, it becomes obvious that what has been previously said as to polymerization, with the suggestion that by-products or cogeneric materials were formed, may be recapitulated with greater definiteness, and one can readily appreciate that the formation of heat-rearranged derivatives or compounds must take place to a greater or lesser degree. Thus, the products herein contemplated may be characterized by being monomers of the type previously described, or esterification polymers, or the heat-rearranged derivatives of the same, and thus including the heat-rearranged derivatives of both the polymers and esterification monomers, separately and jointly. Although the class of materials specifically contemplated in this instance is a comparatively small and narrow class of a broad genus, yet it is obviously impossible to present any adequate formula which would contemplate the present series in their complete ramification, except in a manner employed in the hereto appended claims.

Although the products herein described vary so broadly in their characteristics, i. e., monomers through sub-resinous polymers, soluble products, water-emulsifiable oils or compounds, hydrotropic materials, balsams, sub-resinous materials, semi-resinous materials, and the like, yet there is always present the characteristic unitary hydrophile structure related back to the oxyalkylation, particularly the oxyethylation of the glycerol used as the raw material. When employed as a demulsifier in the resolution of oil field emulsions, they may be added to the emulsion at the ratio of 1 part in 10,000, 1 part in 20,000, 1 part in 30,000, or for that matter 1 part in 40,000. In such ratios it well may be that one cannot differentiate between the solubility of a compound completely soluble in water in any ratio, and a semi-resinous product apparently insoluble in water in ratios by which ordinary insoluble materials are characterized. However, at such ratios the importance must reside in interfacial position and the ability to usurp, preempt, or replace the interfacial position previously occupied perhaps by the emulsifying colloid. In any event, reviewed in this light, the obvious common property running through the entire series, notwithstanding variation in molecular size and physical make-up, is absolutely apparent. Such statement is an obvious over-simplification of the rationale underlying demulsification, and does not even consider the resistance of an interfacial film to crumbling, displacement, being forced into solution, altered wettability, and the like. As to amidification polymers, for instance, where Z is a polyamino amide radical, see what is said subsequently.

COMPLETED POLYMERIC DERIVATIVES INCLUDING HEAT-REARRANGED COGENERS

Example 1

The monomer derived by reaction between one pound mole of an oxyethylated glycerol dimaleate and one pound mole of an alcoholic body of the kind described under the heading "Basic type oxyalkylation compound of amido derivatives of polyamine, Intermediate Example 2" is heated at a temperature of approximately 220–240° C., with constant stirring, for a period of 2–60 hours, so as to eliminate sufficient water to insure that the resultant product has a molecular weight of approximately twice that of the initial polymer.

COMPLETED POLYMERIC DERIVATIVES INCLUDING HEAT-REARRANGED COGENERS

Example 2

The same procedure is followed as in the preceding example, except that polymerization is continued, using either a somewhat longer reaction time, or it may be, a somewhat higher temperature, or both, so as to obtain a material having a molecular weight of approximately three to four times that of the initial product.

COMPLETED POLYMERIC DERIVATIVES INCLUDING HEAT-REARRANGED COGENERS

Example 3

The same procedure is followed as in Examples 1 and 2, preceding, except that the alcoholic body employed is of the kind described previously under the heading "Basic type oxyalkylation compound of amido derivative of polyamine, Intermediate, Example 3."

COMPLETED POLYMERIC DERIVATIVES INCLUDING HEAT-REARRANGED COGENERS

Example 4

The same procedure is followed as in Examples 1 to 3, preceding, except that one polymerizes a mixture instead of a single monomer, for instance, a mixture of materials of the kind described in Completed monomeric derivative, Example 3, and in Completed monomeric derivative, Example 4, are mixed in molecular proportion and subjected to polymerization in the manner indicated in the previous examples.

It is understood, of course, that the polymerized product need not be obtained as a result of a two-step procedure. In other words, one need not convert the reactants into the polymer. The reactants may be converted through the monomer to the polymer in one step. Indeed, the formation of the monomer and polymerization may take place simultaneously. This is especially true if polymerization is conducted in the absence of an inert solvent, as previously described, and if one uses a comparatively higher temperature, for instance, approximately 220° C. for polymerization. Thus, one pound mole of oxyethylated glycerol polymaleate of the kind previously described is mixed with one pound mole of a material obtained by reaction between ricinoleic acid and triethylene tetramine, followed by introduction of at least two oxyethyl radicals. Such mixture is reacted for approximately thirty hours at about 220° C. until the mass is homogeneous. It is stirred constantly during reaction. Polyfunctionality may reside in dehydration (etherization) of two hydroxyl groups attached to dissimilar molecules.

The fact that the polymerized and heat-rearranged products can be made in a single step, illustrates a phenomenon which sometimes occurs either in such instances where alcoholic bodies of the kind herein illustrated are contemplated as reactants, or where somewhat kindred alcoholic bodies are employed. The reactants may be mixed mechanically to give a homogeneous mixture, or if the reactants do not mix to give a homogeneous mixture, then early in the reaction stage there is formed, to a greater or lesser degree, sufficient monomeric materials so that a homogeneous system is present. Subsequently, as reaction continues, the system may become heterogeneous and exist in two distinct phases, one being possibly an oily body of moderate viscosity, and the other being a heavier material, which is sticky or sub-resinous in nature. In many instances it will be found that the thinner liquid material is a monomer and the more viscous or resinous material is a polymer, as previously described. Such product can be used for demulsification by adding a solvent which will mutually dissolve the two materials, or else, by separating the two heterogeneous phases and employing each as if it were a separate product of reaction.

Conventional demulsifying agents employed in the treatment of oil field emulsions are used as such, or after dilution with any suitable solvent, such as water; petroleum hydrocarbons such as gasoline, kerosene, stove oil, a coal tar product such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well-known classes of demulsifying agents.

It is well known that conventional demulsifying agents may be used in a water-soluble form, or in an oil-soluble form, or in a form exhibiting both oil and water-solubility. Sometimes they may be used in a form which exhibits relatively limited oil-solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent used in our herein described process for breaking petroleum emulsions, is based upon ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

Cognizance must be taken of the fact that the surface of the reacting vessel may increase or decrease reaction rate and degree of polymerization, for instance, an iron reaction vessel speeds up reaction and polymerization, compared with a glass-lined vessel.

As has been previously indicated, the sub-genus employed as an alcohol in the present instance is one of a series of alcoholic compounds which are contemplated in our co-pending applications Serial Nos. 447,151; 447,152; 447,153; 447,154; 447,155; 447,156; 447,157; 447,158; 447,159; 447,160; 447,161; 447,163; 447,164; 447,165; 447,166; 447,167 and 447,168, filed June 15, 1942.

It is to be noted that in such instances where the alcoholic body contains a reactive amino hydrogen atom, for instance, in the case where an acylated hydroxylated polyamine is employed, for example, the ricinoleyl acid ester of hydroxyethyl ethylenediamine, the oxyethylated glycerol maleate might react to form an amide of maleic acid. In such instances, of course, such type, to wit, the amido type, is contemplated within the scope of the appended claims in the particular instance, but elaboration is eliminated, because it is unnecessary and would only incur greater length of descriptive matter. Thus, stated in another way, in all appropriate instances, the expression "esterification polymers" in the appended claims, includes amidification polymers, as well as esterification polymers.

Having thus described our invention, what we claim as new and desire to secure by Letters Patent is:

1. A process for breaking petroleum emulsion of the water-in-oil type, characterized by subjecting the emulsion to the action of a demulsifier comprising a member of the class consisting of monomers, sub-resinous esterification polymers, and cogeneric sub-resinous heat-rearranged derivatives of the monomers and aforementioned polymers, separately and jointly, and of the following formula:

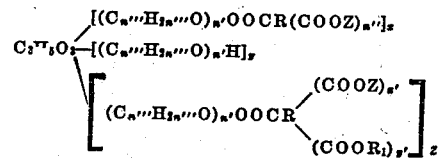

in which R is the carboxyl-free radical of a polybasic carboxy acid having not over 8 carbon atoms; R₁ represents a

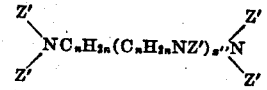

radical, being a basic hydroxylated acylated amino radical in which $n$ represents a small whole number varying from 2 to 10; $x''$ is a small number varying from 0 to 10; Z' is a member of the class consisting of hydrogen, R''CO, R'CO, and D, in which R''CO is a detergent-forming monocarboxy acyl radical having at least 8 and not over 32 carbon atoms; R'CO is a lower molecular weight acid acyl radical having 6 carbon atoms or less, and D is a member of the class consisting of alkyl, hydroxyalkyl, aminoalkyl and acyloxyalkylene, in which instance the acyl group is a member of the class consisting of R''CO and R'CO; and said basic hydroxylated acylated polyamino radical having present at least one member of the class consisting of: (a) an acyloxyalkylene radical, in which the acyl group is R''CO; and (b) joint occurrences of an amido radical, in which the acyl group is R''CO and a hydroxyalkyl radical; Z is an acidic hydrogen atom equivalent including the acidic hydrogen atom itself; $n'''$ represents the numerals 2 to 4; $n'$ represents the numerals 3 to 10; $n''$ represents the numerals 1 to 2; $x$ represents the numerals 0 to 2; $y$ represents the numerals 0 to 2; $z$ represents the numerals 1 to 3; $x'$ represents the numerals 0 to 1; and $y'$ represents the numerals 1 to 2.

2. A process for breaking petroleum emulsions of the water-in-oil type, characterized by subjecting the emulsion to the action of a demulsifier comprising a member of the class consisting of monomers, sub-resinous esterification polymers, and cogeneric sub-resinous heat-rearranged derivatives of the monomers and aforementioned polymers, separately and jointly, and of the following formula:

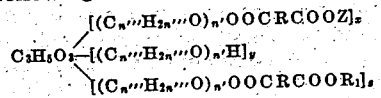

in which R is a carboxyl-free radical of a dibasic carboxy acid having not over 6 carbon atoms; $R_1$ represents a

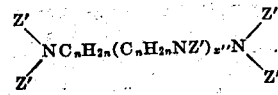

radical, being a basic hydroxylated acylated amino radical in which $n$ represents a small whole number varying from 2 to 10; $x''$ is a small number varying from 0 to 10; $Z'$ is a member of the class consisting of hydrogen, R''CO, R'CO, and D, in which R''CO is a detergent-forming monocarboxy acyl radical having at least 8 and not over 32 carbon atoms; R'CO is a lower molecular weight acid acyl radical having 6 carbon atoms or less, and D is a member of the class consisting of alkyl, hydroxyalkyl, aminoalkyl and acyloxyalkylene, in which instance the acyl group is a member of the class consisting of R''CO and R'CO; and said basic hydroxylated acylated polyamino radical having present at least one member of the class consisting of: (a) an acyloxyalkylene radical, in which the acyl group is R''CO; and (b) joint occurrences of an amido radical, in which the acyl group is R''CO and a hydroxyalkyl radical; Z is an acidic hydrogen atom equivalent including the acidic hydrogen atom itself; $n'''$ represents the numerals 2 to 4; $n'$ represents the numerals 3 to 10; $x$ represents the numerals 0 to 2; $y$ represents the numerals 0 to 2; and $z$ represents the numerals 1 to 3.

3. A process for breaking petroleum emulsions of the water-in-oil type, characterized by subjecting the emulsion to the action of a demulsifier comprising a member of the class consisting of monomers, sub-resinous esterification polymers, and cogeneric sub-resinous heat-rearranged derivatives of the monomers and aforementioned polymers, separately and jointly, and of the following formula:

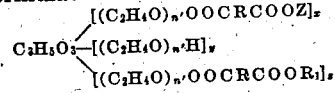

in which R is a carboxyl-free radical of a dibasic carboxy acid having not over 6 carbon atoms; $R_1$ represents a

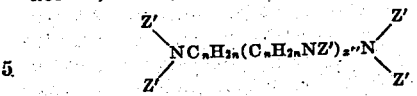

radical, being a basic hydroxylated acylated amino radical in which $n$ represents a small whole number varying from 2 to 10; $x''$ is a small number varying from 0 to 10; $Z'$ is a member of the class consisting of hydrogen, R''CO, R'CO, and D, in which R''CO is a detergent-forming monocarboxy acyl radical having at least 8 and not over 32 carbon atoms; R'CO is a lower molecular weight acid acyl radical having 6 carbon atoms or less, and D is a member of the class consisting of alkyl, hydroxyalkyl, aminoalkyl and acyloxyalkylene, in which instance the acyl group is a member of the class consisting of R''CO and R'CO; and said basic hydroxylated acylated polyamino radical having present at least one member of the class consisting of: (a) an acyloxyalkylene radical, in which the acyl group is R''CO; and (b) joint occurrences of an amido radical, in which the acyl group is R''CO and a hydroxyalkyl radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

4. A process for breaking petroleum emulsions of the water-in-oil type, characterized by subjecting the emulsion to the action of a demulsifier comprising a polar member of the class consisting of monomers, sub-resinous esterification polymers, and cogeneric sub-resinous heat-rearranged derivatives of the monomers and aforementioned polymers, separately and jointly, and of the following formula:

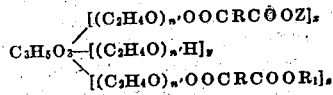

in which R is a carboxyl-free radical of a bibasic carboxy acid having not over 6 carbon atoms; $R_1$ represents a

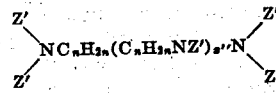

radical, being a basic hydroxylated acylated amino radical in which $n$ represents a small whole number varying from 2 to 10; $x''$ is a small number varying from 0 to 10; $Z'$ is a member of the class consisting of hydrogen, R''CO, R'CO, and D, in which R''CO is a detergent-forming monocarboxy acyl radical having at least 8 and not over 32 carbon atoms; R'CO is a lower molecular weight acid acyl radical having 6 carbon atoms or less, and D is a member of the class consisting of alkyl, hydroxyalkyl, aminoalkyl and acyloxyalkylene, in which instance the acyl group is a member of the class consisting of R''CO and R'CO; and said basic hydroxylated acylated polyamino radical having present at least one member of the class consisting of: (a) an acyloxyalkylene radical, in which the acyl group is R''CO; and (b) joint occurrences of an amido radical, in which the acyl group is R''CO and a hydroxyalkyl radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

5. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

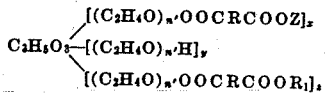

in which R is a carboxyl-free radical of a bibasic carboxy acid having not over 6 carbon atoms; $R_1$ represents a

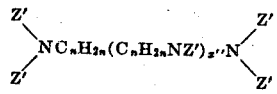

radical, being a basic hydroxylated acylated amino radical in which $n$ represents a small whole number varying from 2 to 10; $x''$ is a small number varying from 0 to 10; $Z'$ is a member of the class consisting of hydrogen, R''CO, R'CO, and D, in which R''CO is a detergent-forming monocarboxy acyl radical having at least 8 and not over 32 carbon atoms; R'CO is a lower molecular weight acid acyl radical having 6 carbon atoms or less, and D is a member of the class consisting of alkyl, hydroxyalkyl, aminoalkyl and acyloxyalkylene, in which instance the acyl group is a member of the class consisting of R''CO and R'CO; and said basic hydroxylated acylated polyamino radical having present at least one member of the class consisting of: (a) an acyloxyalkylene radical, in which the acyl group is R''CO; and (b) joint occurrences of an amido radical, in which the acyl group is R''CO and a hydroxylated radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

6. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

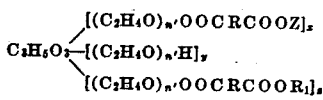

in which R is a carboxyl-free radical of a dibasic carboxy acid having not over 6 carbon atoms; $R_1$ represents a

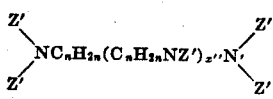

radical, being a basic hydroxylated acylated amino radical in which $n$ represents a small whole number varying from 2 to 10; $x''$ is a small number varying from 0 to 10; $Z'$ is a member of the class consisting of hydrogen, R''CO, R'CO, and D, in which R''CO is a fatty acid radical having at least 8 and not over 32 carbon atoms; R'CO is a lower molecular weight acid acyl radical having 6 carbon atoms or less, and D is a member of the class consisting of alkyl, hydroxyalkyl, aminoalkyl and acyloxyalkylene, in which instance the acyl group is a member of the class consisting of R''CO and R'CO; and said basic hydroxylated acylated polyamino radical having present at least one member of the class consisting of: (a) an acyloxyalkylene radical, in which the acyl group is R''CO; and (b) joint occurrences of an amido radical, in which the acyl group is R''CO and a hydroxyalkyl radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 2.

7. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

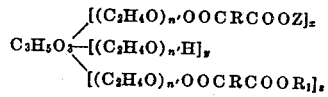

in which R is a carboxyl-free radical of a dibasic carboxy acid having not over 6 carbon atoms; $R_1$ represents a

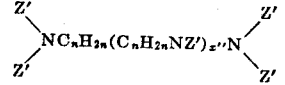

radical, being a basic hydroxylated acylated amino radical in which $n$ represents a small whole number varying from 2 to 10; $x''$ is a small number varying from 0 to 10; $Z'$ is a member of the class consisting of hydrogen R''CO, R'CO, and D, in which R''CO is a higher fatty acid radical having 18 carbon atoms; R'CO is a lower molecular weight acid acyl radical having 6 carbon atoms or less, and D is a member of the class consisting of alkyl, hydroxyalkyl, aminoalkyl and acyloxyalkylene, in which instance the acyl group is a member of the class consisting of R''CO and R'CO; and said basic hydroxylated acylated polyamino radical having present at least one member of the class consisting of: (a) an acyloxyalkylene radical, in which the acyl group is R''CO; and (b) joint occurrences of an amido radical, in which the acyl group is R''CO and a hydroxyalkyl radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

8. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

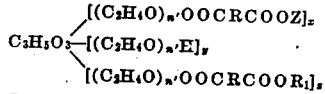

in which R is a carboxyl-free radical of a dibasic carboxy acid having not over 6 carbon atoms; $R_1$ represents a

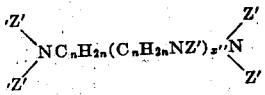

radical, being a basic hydroxylated acylated amino radical in which $n$ represents a small whole number varying from 2 to 10; $x''$ is a small number varying from 0 to 10; $Z'$ is a member of the class consisting of hydrogen $R''CO$, $R'CO$, and D, in which $R''CO$ is a ricinoleyl radical; $R'CO$ is a lower molecular weight acid acyl radical having 6 carbon atoms or less, and D is a member of the class consisting of alkyl, hydroxyalkyl, aminoalkyl and acyloxyalkylene, in which instance the acyl group is a member of the class consisting of $R''CO$ and $R'CO$; and said basic hydroxylated acylated polyamino radical having present at least one member of the class consisting of: (a) an acyloxyalkylene radical, in which the acyl group is $R''CO$; and (b) joint occurrences of an amido radical, in which the acyl group is $R''CO$ and a hydroxyalkyl radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

MELVIN DE GROOTE.
BERNHARD KEISER.